May 31, 1927.
W. H. WALLACE
VEHICLE SPRING
Filed April 8, 1925
1,630,364
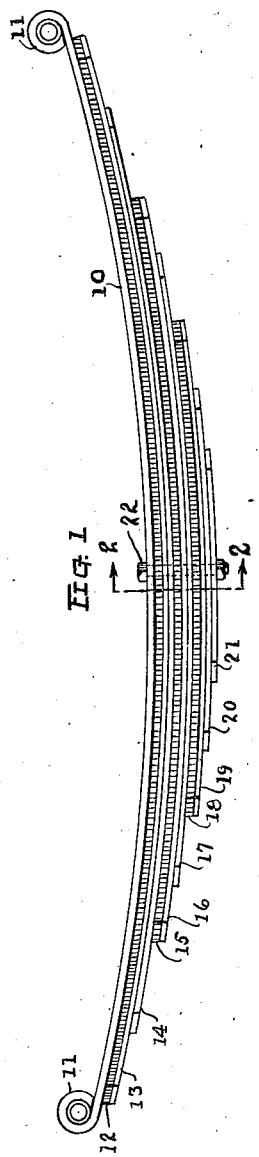
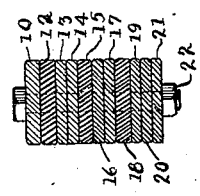
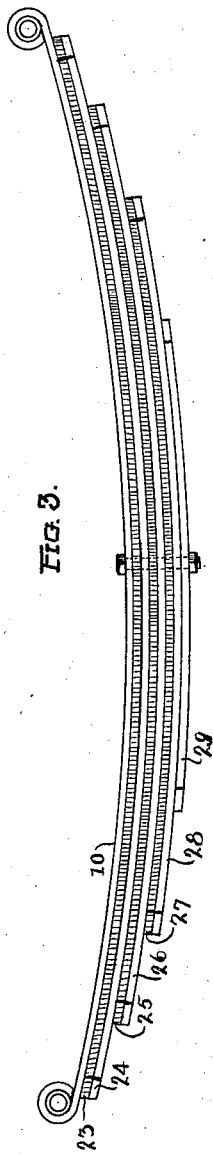
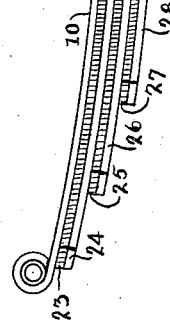
Inventor
William H. Wallace
By B. M. Kent
Attorney Patented May 31, 1927.

1,630,364

UNITED STATES PATENT OFFICE.

WILLIAM H. WALLACE, OF CLEVELAND, OHIO, ASSIGNOR, BY MESNE ASSIGNMENTS, TO THE EATON SPRING CORPORATION, OF DETROIT, MICHIGAN, A CORPORATION OF OHIO.

VEHICLE SPRING.

Application filed April 8, 1925. Serial No. 21,518.

This invention is an improvement in the form of spring construction described in the McIntyre Patent 1,014,406, granted January 9, 1912. It is one of the objects of the present invention to overcome certain objections to the patented construction and particularly with reference to improving the riding qualities and also to insure that the ends of the "soft" leaves shall be properly supported.

In this type of spring, some of the leaves are made from "soft" or relatively non-resilient steel or iron instead of using spring steel for all of the leaves, as is the usual practice. The effect of the "soft" leaves is to slow up the action of the spring, particularly on the rebound movements and, hence, springs made in this manner have proved to possess easy riding qualities and eliminate the necessity for using devices for checking the rebound, as is the common practice in connection with springs made entirely from spring steel.

Other objects of the invention and the features of novelty will be apparent from the following description taken in connection with the accompanying drawings, of which:

Figure 1 is a side elevation of a semi-elliptic vehicle spring, embodying my invention;

Fig. 2 is an enlarged transverse section on the line 2—2 of Fig. 1; and

Fig. 3 is a view similar to Fig. 2 but showing a different arrangement of leaves.

Referring to Figs. 1 and 2, 10 indicates the main leaf of the spring which has, according to the usual practice, eyes 11 at the ends thereof. The leaf 10 is made from resilient material such as ordinary spring steel and is backed up by a leaf 12, that is slightly shorter than the leaf 10, and is made from "soft" or non-resilient metal such as wrought iron or low carbon steel. For this purpose I would recommend a steel having a carbon content as low as four or five, using the customary commercial designation for the carbon content. The leaf 12 is preferably of the same gauge or thickness as the leaf 10, and is backed up by a leaf 13, of resilient material, which is of substantially the same length. The leaf 13 is backed up by a shorter leaf 14, of resilient material and the latter is backed up by a still shorter leaf 15, of non-resilient material. The leaf 15 is preferably of the same gauge or thickness as the leaf 12 and is backed up by a leaf 16, of resilient material, and of the same length. The leaf 16 is backed up by a shorter leaf 17, of resilient material, and the latter is backed up by a still shorter leaf 18, of non-resilient material. The leaf 18 is preferably of the same gauge of thickness as the leaves 12 and 15 and is backed up by a leaf 19 of resilient material, of the same length. The leaf 19, in the particular spring illustrated in Figs. 1 and 2, is backed up by two shorter leaves 20 and 21, of resilient material, and all of the leaves are clamped together by the usual center bolt 22.

In Fig. 1, the leaves that are made of "soft" or non-resilient material are shaded to distinguish them from the leaves of resilient material.

In the application of my invention to an actual spring made from leaves two inches wide, with the length between the eyes 11, fifty-four inches and which would have a deflection rate of one hundred and fifteen pounds per inch, the leaves 10, 12, 15 and 18 were formed of No. 3 gauge stock and the other leaves of No. 7 gauge stock, there being eleven leaves in all. The leaves 12 and 13 were 53½ inches long; the leaf 14 was 45½ inches long, the leaves 15 and 16 were 37½ inches long, the leaf 17 was 31 inches long, the leaves 18 and 19 were 24½ inches long, and the leaves 20 and 21 were 18 inches and 11½ inches long, respectively.

I have found it desirable to have each leaf, of non-resilient material, backed up by a plurality of leaves of resilient material but of thinner gauge and this arrangement is illustrated in Figs. 1 and 2. It will also be observed from Fig. 1 that each of the leaves of non-resilient material is backed up by a leaf of resilient material, of the same length, so that the leaf of non-resilient material is supported throughout its entire length and the ends of the leaves of non-resilient material are thus prevented from taking a permanent set, when the spring deflects, that would cause the ends to droop away from the leaf immediately above. By thus maintaining the ends of the non-resilient leaves in contact with the adjoining leaves the rate of deflection is maintained substantially uniform, commercially speaking, throughout the life of the spring.

While, as above stated, it is desirable to have each non-resilient leaf backed up by a plurality of leaves of thinner gauge material, it is, nevertheless, practicable to construct a spring in which the non-resilient leaves are alternated with leaves of resilient material and of the same gauge, and a spring, thus constructed, is illustrated in Fig. 3 wherein the main leaf 10 is backed up by a non-resilient leaf 23, and the latter is backed up by a resilient leaf 24, of the same length. The leaf 24 is backed up by a leaf 25, of non-resilient material, and the latter is backed up by a resilient leaf 26 of the same length. The leaf 27 is of non-resilient material and the leaves 28 and 29 of resilient material, the leaf 28 being of the same length as the leaf 27.

Having thus described my invention, what I claim is:

1. A spring comprising a plurality of superposed leaves of varying lengths some of which are formed of resilient metal and the others of relatively non-resilient metal, each of said leaves of non-resilient metal being backed-up by a plurality of leaves of resilient metal of which the one adjoining the leaf of non-resilient metal is of substantially the same length as the latter, as and for the purpose described.

2. A spring comprising a plurality of superposed leaves of varying lengths some of which are formed of resilient metal and the others of relatively non-resilient metal, each of said leaves of non-resilient metal being backed-up by a plurality of leaves of resilient metal of less thickness than the leaf of non-resilient metal and the one of said leaves of resilient metal which adjoins the leaf of non-resilient metal being substantially the same length as the latter, as and for the purposes described.

3. A multiple-leaf spring consisting of a main leaf of resilient metal, a leaf of relatively non-resilient metal adjoining said main leaf, a leaf of resilient metal adjoining the second-mentioned leaf and substantially the same length as the latter, a leaf of resilient metal adjoining the third-mentioned leaf and shorter than the latter, and a series of reinforcing leaves for the leaves mentioned, some of which are of resilient metal and the others of non-resilient metal, and each of the latter being backed-up by one of the last-mentioned leaves of resilient metal which is of substantially the same length as the leaf of non-resilient metal.

4. A multiple-leaf spring consisting of a main leaf of resilient metal, a leaf of relatively non-resilient metal adjoining said main leaf, a leaf of resilient metal adjoining the second-mentioned leaf and substantially the same length as the latter, a leaf of resilient metal adjoining the third-mentioned leaf and shorter than the latter, and a series of reinforcing leaves for the leaves mentioned, some of which are of resilient metal and the others of non-resilient metal, and each of the latter being backed-up by one of the last-mentioned leaves of resilient metal which is of substantially the same length as the leaf of non-resilient metal, said leaves of non-resilient metal being of substantially the same thickness as said main leaf and the other leaves of resilient metal being of less thickness than the same, as and for the purposes described.

In testimony whereof I affix my signature.

WILLIAM H. WALLACE.